//  
United States Patent Office 3,386,843  
Patented June 4, 1968

3,386,843  
QUINACRIDONE PIGMENTS  
Edward E. Jaffe, Union, and William J. Marshall, Scotch Plains, N.J., assignors to E. I. du Pont de Nemours and Company, Wilmington, Del., a corporation of Delaware  
No Drawing. Continuation-in-part of application Ser. No. 312,863, Oct. 1, 1963. This application Oct. 23, 1965, Ser. No. 504,223  
8 Claims. (Cl. 106—288)

ABSTRACT OF THE DISCLOSURE

Metal salts of quinacridone sulfonic acids which have the structural formula,

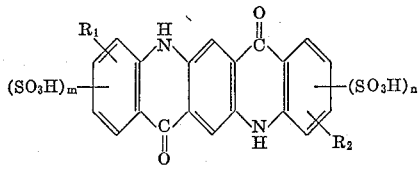

wherein $m$ and $n$ are integers of 0 to 1, the sum of $m$ and $n$ being 1 to 2 inclusive, $R_1$ and $R_2$ are hydrogen, a lower alkyl, lower alkoxy or halogen and the metal ions are from the group consisting of aluminum, magnesium, zinc, divalent copper, cadmium, nickel, trivalent chromium, cobalt, and divalent manganese. These compounds improve the properties of quinacridone pigment dispersions in coating compositions.

---

This application is a continuation-in-part of Jaffe et al., Ser. No. 312,863, filed Oct. 1, 1963, now abandoned.

This invention relates to materials for improving the dispersion properties of quinacridone pigments and to improved quinacridone pigments containing such materials. More specifically, it relates to sulfonated quinacridone compounds and their use to improve the properties of quinacridone pigment dispersions in coating compositions. Still more specifically, it relates to aluminum salts of sulfonated quinacridone compounds and the use thereof as well as the use of free quinacridone sulfonic acid and other metal salts thereof both as agents to prevent crystal growth of quinacridone pigments during aqueous extraction steps and as agents for improving the shear-strength uniformity of coating compositions containing a quinacridone pigment.

In spite of the apparent insolubility of quinacridone pigments in aqueous systems, it has been found that finely divided quinacridone products frequently undergo a substantial increase in particle size when subjected to an aqueous heat treatment. Thus, it is common practice to reduce the particle size of quinacridone pigments by ball milling with a finely divided inorganic salt such as sodium chloride or hydrated aluminum sulfate, after which the salt is removed by a hot extraction in dilute aqueous acid. Similarly, particle size reduction may be accomplished by solution in concentrated sulfuric acid followed by dilution in water to precipitate the finely divided pigment. In each case the resulting particle size has been found to vary with changes in the extraction technique, particularly those of temperature. Thus, it is obvious that the crystallites may actually grow in size during the extraction. Since such crystal growth is reflected in deterioration of desirable pigment properties (e.g. tinting strength, transparency, etc.), a method of inhibiting this growth is sorely needed.

Furthermore, coating compositions containing quinacridone pigments may exhibit profound differences in color depending upon the method of application of the coating composition film, the amount of dispersive effort applied while depositing the coating upon the substrate, and the degree to which the film is disturbed during drying. Also, coating compositions pigmented with quinacridones may show objectionable flow properties so as to seriously limit the quantity of pigment which can be incorporated into the vehicle to produce a composition with adequate flow for practical use.

Both the color variations aforementioned and the limited flow of conventional quinacridone enamels are believed to be a consequence of poor dispersion of the pigment particles in the vehicle. Quinacridone dispersions exhibiting these defects contain a large proportion of the pigment in the form of loosely bound pigment clusters, agglomerates, and the like so that the pigment particles are not dispersed to the optimum degree. The internal cohesive forces in the pigment clusters, agglomerates and the like are sufficiently weak to permit them to break down irreversibly under shearing force, such as that which results from the brushing of the film or from the passing of a coating composition through a zone of intense turbulence and shear. Thus, the color of a film of a paint which contains such incompletely dispersed pigment particles depends on the extent to which the pigment is freed from the clusters and agglomerates, and this in turn varies with the manner in which the coating is applied. For example, in the painting of automobiles, the main portion of the body may be sprayed which process tends to break up pigment clusters and agglomerates, whereas other portions such as the fenders may be dipped, an operation which has little pigment dispersive effect. Consequently, the body and fenders may differ in color upon the use of a given coating composition which contains incompletely dispersed pigment as previously described. Another manifestation of the same problem is found in brush applications where, in lapping a freshly painted surface over one just previously painted, it is frequently observed that the brush strokes on the previously painted surface give a considerably higher degree of color strength than is shown by the adjacent freshly painted surface.

The term "flocculation" is frequently used in the art to describe such observed color variations regardless of their cause. However, as was pointed out in U.S. Patent 2,967,841, the term "flocculation" properly refers to only one possible cause of the color variation. Consequently, the term "shear-strength uniformity" has been proposed to describe the degree of color dependence on variation in method of applying coating compositions and will be so used herein.

This invention resides in the discovery of new compositions of matter namely, metal salts of quinacridone sulfonic acids, which are useful in improving the tinctorial and rheological properties of quinacridone pigments. It further resides in the discovery that the defects in quinacridone pigments arising, on the one hand, from crystal growth during the isolation of the pigment and, on the other hand, from inadequate dispersion of the pigment particles in the coating composition can be substantially overcome by associating with the quinacridone pigment a small amount of a sulfonated quinacridone compound which may be a quinacridone sulfonic acid having up to two sulfonic acid groups per molecule, or a metal salt thereof, especially an aluminum salt. It is preferred that the sulfonated quinacridone compound be added to the pigment prior to its isolation but, when the principal interest is in shear-strength uniformity alone, the addition may take place at any point up to the preparation of the coating composition.

With respect to the prior art, the use of a polyvalent metal salt, preferably the aluminum salt of a copper phthalocyanine polysulfonic acid, to improve the shear-strength properties of phthalocyanine pigments is disclosed in U.S. Patent 2,816,045. It is also known in the art to improve dispersion properties of copper phthalocyanine pigments by the use of aluminum benzoate, as described in U.S. Patent 2,327,472, and aluminum benzoate has also been used with other pigments for this same purpose. The preparation of water soluble sulfonated quinacridone by heating quinacridone at 100° C. in concentrated sulfuric acid is disclosed by Liebermann (Annalen, vol. 518, p. 251, 1935); however, the degree of sulfonation and the positions of the substituent groups are not shown.

An object of this invention is the inhibition crystal growth of quinacridone pigments during aqueous extraction steps. Another object is an improvement in shear-strength uniformity of quinacridone pigments. Still another object is the provision of agents which can be added to quinacridone pigments in minor amounts to inhibit crystal growth and improve the dispersion characteristics of said quinacridone pigments, particularly with respect to shear-strength uniformity. A further object is the preparation of quinacridone pigments of extremely small ultimate particles as well as the preparation of quinacridone pigments of improved shear-strength uniformity. A still further object is the preparation of aluminum salts of sulfonated quinacridones. Other objects and achievements of this invention will appear as the description proceeds.

The quinacridone sulfonic acids of this invention can be prepared either by sulfonation or by synthesis from appropriate sulfonated intermediates. They can be characterized by the formula:

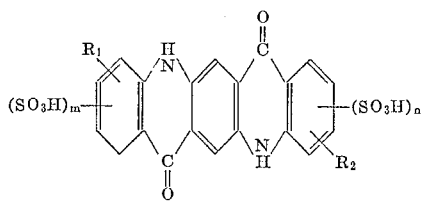

wherein $m$ and $n$ are integers of from 0 to 1 and their sum is usually from 1 to 2 inclusive, and $R_1$ and $R_2$ may be hydrogen, lower alkyl or alkoxy groups having from 1 to 3 carbon atoms, or halogen. These compounds are useful in the form of the sulfonic acid itself and also in the form of certain metal salts of the acid with the aluminum salt being the preferred agent. From optimum results, it is preferred to have the substituent sulfonic acid groups in the 2 and/or 9 positions of the molecule, due to the better lightfastness relative to compounds containing the substituents in other positions. The degree of sulfonation can be varied but for optimum results it is preferred that the degree of sulfonation not be substantially in excess of 2 sulfonic acid groups per molecule of quinacridone.

To attain the improvement desired in resistance to crystal growth or in shear-strength uniformity, two distinct methods are available. On the one hand the quinacridone may be sulfonated to the degree necessary (or mixed with the requisite amount of the product of direct sulfonation) and the sulfonated portion converted to the desired sulfonated quinacridone compound, such as a metal salt, preferably the aluminum salt, during subsequent processing steps. On the other hand the desired sulfonated quinacridone compound (the aluminum salt, for instance) may be separately prepared and blended in the requisite proportion with unsulfonated quinacridone. Where the objective is shear-strength uniformity, the manner of incorporating the sulfonated quinacridone compound into the unsulfonated quinacridone is not critical, and this step may even be delayed to the last stages of preparing the coating composition. However, where the purpose is to inhibit crystal growth during the aqueous extraction step, it is essential that the sulfonated quinacridone be introduced no later than this extraction step. Thus, for example, dry crude quinacridone may be ball milled together with a moiety of an appropriate salt of sulfonated quinacridone in the presence of dry aluminum sulfate (as in U.S. Patent 3,030,370), following which the pigment is separated from the salt by extraction with hot aqueous acid, whereupon the aluminum quinacridone sulfonate is formed in situ in intimate association with the unsulfonated quinacridone. For optimum results it is preferred to precipitate the sulfonated quinacridone compound on the unsulfonated quinacridone. However, where the inhibition of crystal growth is not a factor and the only consideration is shear-strength uniformity, the sulfonated quinacridone compound may be ground together with the unsulfonated quinacridone in the preparation of the coating composition or the two pigments may be separately ground and the resulting coating compositions subsequently blended in the desired proportions. In general, such blends require more of the sulfonated species to attain a desired degree of shear-strength uniformity than in the case where the sulfonated quinacridone is precipitated on the prime quinacridone pigment.

The proportion of sulfonated quinacridone compound which must be mixed with unsulfonated quinacridones to inhibit crystal growth and to produce a mixed pigment of improved shear-strength uniformity characteristics varies between about 1% and 20% on the basis of the combined pigment weight. The optimum for shear-strength uniformity depends somewhat on the particular vehicle involved. The inhibition of crystal growth and the improvement in shear-strength uniformity consequent on the addition of the sulfonated quinacridone compound are evident with all quinacridone pigments, including quinacridone, quinacridonequinone, as well as substituted derivatives thereof, such as dimethoxyquinacridone, dichloroquinacridone, difluoroquinacridone, dimethylquinacridone, dichloroquinacridone, etc. and also solid solutions of the foregoing quinacridone compounds in any combination.

For a clear understanding of the improvements shown in the examples given below, it is helpful to consider the following testing methods which are commonly used in the evaluation of pigments.

TESTING METHODS

A. Test for shear-strength uniformity

Examination of a pigmented alkyd coating composition is a preferred method of evaluation of shear-strength uniformity since problems with this property are particularly troublesome in alkyd vehicles. Such a test may be conveniently carried out with quinacridone-type pigments as follows. To prepare the full shade enamel:

Weigh into a ½ pint glass jar approximately 2½ inches inside diameter:

| | Grams |
|---|---|
| Quinacridone pigment | 15.0 |
| Alkyd resin solution (coconut oil modified nonoxidizing glyceryl phthalate resin as a 60% solid solution in a mixture of 71% xylene, 24% high flash naphtha, and 5% butanol. Weight of 60% solids solution.) | 31.3 |
| V.M.P. naphtha | 30.0 |
| Xylene | 30.0 |
| ⅛ inch steel shot | 350.0 |

The mixture is ball-milled in conventional fashion by rotating the jar on rollers. After grinding for 72 hours, the following are added to the mill:

| | Grams |
|---|---|
| Alkyl resin solution (as described above) | 46.6 |
| V.M.P. naphtha | 13.5 |
| Xylene | 13.5 |

The added material is thoroughly incorporated by milling for 20 to 30 minutes. The balls are then separated by screening and the remainder is added to:

| | Grams |
|---|---|
| Alkyd resin solution (as described above) | 50.0 |
| 55% solution in butanol/xylene (44%/56%) of melamine-formaldehyde resin | 59.8 |
| V.M.P. naphtha | 5.0 |
| Xylene | 5.0 |

To test the properties of the enamel, a tint is prepared by mixing:

| | Grams | |
|---|---|---|
| Full shade enamel (prepared as described in the first part of the example) | 18.0 | |
| White enamel based on above melamine-modified alkyd resin and having the following compositions: | | 101.0 |
|   TiO$_2$ | 17.2% | |
|   Alkyd resin solids | 31.9% | |
|   Melamine resin solids | 13.7% | |
|   Xylene | 18.6% | |
|   V.M.P. naphtha | 18.6% | |

After thorough mixing, this red enamel is applied to a suitable metal panel by conventional spraying. After the coating was dried, a portion of the panel is given a second coating by dipping it in the coating composition. When the dipped coating is dried, the enamel is rated for shear-strength uniformity on the basis of the relative appearance of the sprayed and dipped portions of the panel. The two portions are practically identical in appearance in the case of pigments yielding coating compositions of excellent shear-strength uniformity, whereas a marked color difference exists in the case of coatings having poor shear-uniformity.

Alternatively, the coating may be rated by comparing the appearance of a conventional sprayed coating and a portion of the coating which has been disturbed by rubbing while tacky before drying. The test is conducted as follows:

After thorough mixing, the light red enamel, prepared as described in the first part of this method, is applied to a suitable metal panel by spraying in conventional fashion. After drying approximately 15 minutes, but before the coating is completely dry, one end of the coating on the panel is rubbed with moderate pressure. When the coating is completely dry, the enamel is rated for shear-strength uniformity on the basis of the relative color appearance of the rubbed portion compared with the unrubbed portion. Systems exhibiting poor shear-strength uniformity show a marked development in color on the rubbed portions relative to the unrubbed section, whereas those rated excellent in shear-strength uniformity show substantially no color development as the result of the rubbing.

B. Tests for inhibition of crystal growth

To demonstrate the improvement resulting from inhibiting crystal growth, it might be advantageous to resort to an actual measurement of particle size which would be applicable to both the treated and the untreated pigments. Although the differences are readily apparent from microscopic examination, the method does not readily lend itself to numerical designation of the observed differences. Gas adsorption techniques which measure the specific surface of the pigment are excessively time consuming. Since, in effect, the smaller particle size is reflected in increased tinting strength or transparency of the coating compositions, and since these functional tests are routinely performed in assessing the character of the products, it is not necessary to resort to other measurements to demonstrate the merit of this invention. Furthermore, it is the improvement in tinting strength and transparency which demonstrates the unexpected utility of the process.

B1. Relative tinctorial strength

Relative tinctorial strengths of coating compositions may be determined by preparing enamel tints as described in Method A and adjusting the strength of one tint to equal that of the other. The technique is well known in the art and need not be further explained here.

B2. Transparency

Transparency may be measured by an adaptation of the accepted methods of determining the hiding power of coating compositions, as described in H. A. Gardner and George G. Sward's Paint Testing Manual, 12th edition (1962), p. 76 ff. Specifically the full strength enamels (as prepared in Method A) are used for this purpose. Films of controlled thickness are drawn down with a 0.005" Bird applicator (Gardner, op. cit. p. 96) over special chart paper which is half white and half black. Suitable papers for this purpose are Form 09 manufactured by Morest Co., 211 Center Street, New York, N.Y., and Form 2C manufactured by Lenata Co., P.O. Box 576, Hoboken, N.J. The reflectance over the black and over the white are measured with a Hunter Multi-purpose Reflectometer equipped with a green filter. The contrast ratio is expressed as the ratio of the black reflectance over the white reflectance. The greater this number, the greater is the opacity of the coating. Conversely, the smaller this number, the greater is the transparency.

For a clearer understanding of the invention, the following specific examples are given. These examples are intended to be merely illustrative of the invention and not in limitation thereof. Unless otherwise specified, all parts are by weight.

EXAMPLE I

Quinacridone-2,9-disulfonic acid is synthesized in a 3-step synthesis as follows:

Step 1.—51.2 parts (0.2 mol) of diethyl succinylsuccinate is added to 630 parts of 2B alcohol (ethanol denatured with a small quantity of benzene), and the mixture is heated gently to dissolve the solid. To the resulting solution is added 100 parts (0.58 mol) of sulfanilamide (p-aminobenzenesulfonamide) and 3.5 parts of commercial concentrated hydrochloric acid and the mixture is then heated in an atmosphere of nitrogen for 5 hours, under a reflux condenser. After heating, the slurry is filtered and the precipitate on the filter is washed with 2B ethyl alcohol, then with water until free of acid, and finally is dried in conventional fashion. A yield of 107 parts of Compound I is obtained corresponding to 95% of the theoretical yield.

I

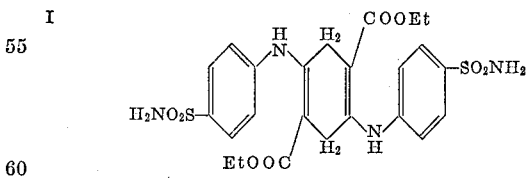

Step 2.—40.0 parts of the product of Step 1 is added to 385 parts of 2B ethyl alcohol. 40.0 parts of m-nitrobenzene sodium sulfonate and a solution of 16.0 parts of potassium hydroxide dissolved in 160 parts of water are then added. The mixture is heated to the boil and boiled for 1.5 hours under a reflux condenser, after which it is diluted with about 500 parts of water and the solid is separated by filtration and acidification of the filtrate with concentrated HCl. A dark brown precipitate is formed on acidification of the filtrate and this on standing turns to a bright yellow. The bright yellow product is isolated by filtration, and washing free of soluble salts with water. A yield of 32.5 parts is obtained corresponding to 90% of the theoretical yield of Compound II.

II

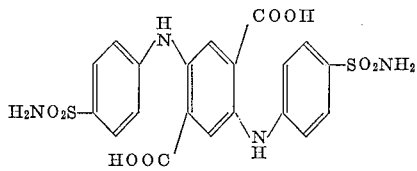

Step 3.—Compound II is converted into the desired quinacridone sulfonic acid by heating with polyphosphoric acid as follows:

100 parts of polyphosphoric acid is mixed with 5.0 parts of the product of Step 2 and the mixture is then stirred and heated to 140°–150° C. and maintained at that temperature for 3 hours. During the first few minutes of heating, the mass turns red and on continued heating the color changes to violet. Following completion of the 3-hour heating period, the mixture is cooled and water (approximately 10 times the volume of the mixture) is added slowly with a complete solution being obtained. Sodium chloride is added until saturation, whereupon a red sodium salt precipitates. The precipitated sodium salt is filtered, washed free of acid with a saturated solution of sodium chloride and then washed with cold water until a substantial coloration of the effluent wash water is observed. The washed product is then dried. Observed percent nitrogen in the product equals 5.18%; calculated percent nitrogen equals 5.43% for Compound III.

III

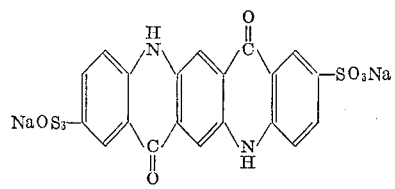

The sodium salt is slurried in about 400 parts of water and is precipitated as an aluminum salt by the slow addition of about 3 parts of $Al_2(SO_4)_3 \cdot 18H_2O$ dissolved in water. The slurry is filtered and the filter cake is washed and dried. A mixture of 15 parts of the dry product and 85 parts of beta phase quinacridone pigment is markedly superior to the conventional beta phase quinacridone pigment with respect to shear-strength uniformity when tested as described in Method A.

EXAMPLE II

Quinacridone is sulfonated by gently heating with concentrated sulfuric acid as follows:

20 parts of quinacridone is stirred into 200 parts of 96% sulfuric acid. The mixture is heated to 100° C. and maintained at that temperature for 6.5 hours after which it is cooled and addded with vigorous stirring to about 6000 parts of water at room temperature. The mixture is again cooled, filtered, and the filtrate is then saturated with sodium chloride. The precipitated sodium salt of the sulfonated quinacridone is removed by filtration and is washed acid-free on the filter with saturated sodium chloride solution. The washed product is reslurried in 200 parts of water at room temperature (25° C.) and the precipitate separated by filtration. 31 parts of a red product is obtained which may be identified by its infrared spectrum as the same product as the sodium quinacridone 2,9-disulfonate of Example I.

The sodium salt thus obtained is slurried in about 2000 parts of water and is precipitated as an aluminum salt by slow addition of about 20 parts of aluminum sulfate $(Al_2(SO_4)_3 \cdot 18H_2O)$ dissolved in water. The aluminum salt is then isolated in conventional fashion by filtration, washing and drying. A mixture of 20 parts of the dry product with 80 parts of quinacridone pigment yields a product which, in coating compositions, is markedly improved in shear-strength uniformity and intensity relative to the corresponding quinacridone pigment without the the aforementioned addition of quinacridone sulfonic acid compound. In lightfastness, and in alkali and soap sensitivity, the treated product is substantially equal to the conventional quinacridone counterpart.

EXAMPLE III

Pigmentary sized beta phase quinacridone is prepared by milling as described in U.S. Patent 3,030,370 as follows:

15 lbs. of crude quinacridone is charged to a ball mill with 135 lbs. of commercial hydrated aluminum sulfate $(Al_2(SO_4)_3 \cdot 15-18H_2O)$, 4 lbs. perchloroethylene, 1500 lbs. of steel balls and 150 lbs. of roofing nails. The size of the mill is such that the charge occupies approximately one-half of the mill volume. The pigment is milled in conventional fashion by rotating the mill for approximately 72 hours, after which the powder is discharged from the mill through a sieve to remove the balls. The milled powder is added to 1500 lbs. of 2% sulfuric acid solution, the mixture is heated to approximately 90° C. and stirred at that temperature for about an hour, after which the pigment is isolated by filtration, and washing the filter cake free of acid. The product is beta phase quinacridone.

The presscake, containing about 15.0 parts (dry basis) of pigment, is reslurried in 900 parts of water with vigorous agitation. To the stirred suspension of pigment thus formed is added a solution of 1.65 parts of disodium quinacridone-2,9-disulfonate prepared as described in Example I, in 50 parts of water. (The sodium quinacridone disulfonate solution is prepared by dissolving the material in boiling water, and allowing it to cool.) The suspension is heated to 40° C., with stirring, over a period of 30 to 40 minutes and 2.0 parts of hydrated aluminum sulfate $(Al_2(SO_4)_3 \cdot 15-18H_2O)$ dissolved in 50.0 parts of water, is added gradually with stirring over a period of 30 to 40 minutes. The slurry is stirred for about 15 minutes following completion of addition of the aluminum sulfate solution, and the product is then isolated by filtration and washing the filter cake free of acid and sulfate ions and drying. There is obtained 16.5 parts of a dry product which comprises beta phase quinacridone upon which has been deposited about 10% of the aluminum salt of sulfonated quinacridone.

A melamine-fortified alkyd vehicle pigmented with the quinacridone-aluminum quinacridone disulfonate blend prepared as described in this example, shows markedly improved shear-strength uniformity compared to the counterpart composition containing untreated quinacridone. An additional advantage for the sulfonic acid salt treated material is an approximately 20% improvement in tinting strength. A product containing only ½ the quantity of quinacridone disulfonic acid compound as that described in the preparation above shows a lesser but still significant advantage in shear-strength uniformity compared to the corresponding untreated counterpart.

EXAMPLE IV

Aluminum sulfate used in milling quinacridone may be used to precipitate an aluminum salt of sulfonated quinacridone:

8 lbs. of quinacridone is milled for about 24 hours with 50 lbs. of commercial aluminum sulfate

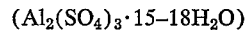

1 lb. of tetrachloroethylene and 0.36 lb. of cetyl trimethyl ammonium chloride in a 60 gallon mill having an internal diameter of about 24 inches containing about 1000 lbs. of "Cyl-Pebs" (cylindrical bars of iron approximately ½ inch diameter and 1 inch long). At the conclusion of milling, the milled powder is separated from the "Cyl-Pebs" by sieving.

Quinacridone sulfonic acid is prepared by heating 2.4 parts of quinacridone with 44 parts of 98% sulfuric acid at 100° C. for one hour with stirring. The mixture is then cooled to room temperature and added with stirring to 1000 parts of water. To the resulting solution is added 168 parts of the quinacridone-aluminum sulfate mill powder prepared as described above. The mixture is boiled for 2 hours, then filtered and washed free of sulfate with water. The product is dried and dispersed in a coating composition in conventional fashion. It shows excellent shear-strength uniformity and also improved tinting strength relative to its counterpart from a portion of the same mill powder extracted in the absence of the sulfonated quinacridone compound.

EXAMPLE V

The following example illustrates a simplified preparation of aluminum quinacridone sulfonate without entailing the intermediate isolation of the sodium salt thereof (as in Example II):

To 2500 parts of 96% sulfuric acid is added 250 parts of crude quinacridone. The mixture is heated to 100° C. and maintained at that temperature for 5 hours. It is then cooled to approximately 40° C. and added with vigorous stirring to 30,000 parts of a mixture of chopped ice plus water. To the stirred slurry is added 534 parts of hydrated aluminum sulfate $(Al_2(SO_4)_3 \cdot 15H_2O)$. The mixture is then boiled with open steam for 3 hours, following which the product is isolated by filtration and washing with a saturated solution of aluminum sulfate. Washing is continued until the pH of the filtrate is about the same as that of the aluminum sulfate solution. The product, after drying at 82° C., is obtained in a yield of 472 parts.

Calculated yield for aluminum quinacridone disulfonate (M.W.=488) _____ parts__ 391
Excess is assumed to be aluminum sulfate; i.e. the product contains 82.9% of aluminum quinacridone disulfonate _____ parts__ 81
N calculated for $C_{20}H_{10}Al_{2/3}N_2O_8S_2$ _____ percent__ 5.74
N found in product _____ do____ 4.73
N calculated for product of 82.9% purity __do____ 4.76

The following examples illustrate the beneficial effect on particle size, as exemplified in the improvement of tinting strength and transparency, of the introduction of the aluminum salt of quinacridone sulfonic acid:

EXAMPLE VI

The following example demonstrates the use of an aluminum salt of quinacridone sulfonic acid blended with beta phase quinacridone.

15 parts of crude beta phase quinacridone (U.S. 2,844,485) is charged to a ball mill of suitable dimensions, containing 1500 parts of steel balls and 150 parts roofing nails, along with 135 parts of commercial hydrated aluminum sulfate $(Al_2(SO_4)_3 \cdot 15-18H_2O)$, 4 parts perchloroethylene and a selected amount (see below) of the aluminum salt of quinacridone sulfonic acid of Example V. The mill is rotated in conventional fashion for 72 hours, following which the powder is discharged from the mill. This powder is added to 1500 parts of aqueous 2% sulfuric acid solution; the mixture is heated to 90° C. and stirred at that temperature for about 1 hour, after which the pigment is isolated by filtering, washing free of acid and soluble salts and drying. The dry pigment is a beta phase quinacridone of good strength, but the strength and transparency vary considerably as the amount of the aluminum salt of quinacridone sulfonic acid (AQD) is varied.

The following table sumarizes the results:

| Charge | AQD Used (Pts.) | AQD, percent | Relative Strength | Transparency (Contrast Ratio) | Shear-Strength Uniformity |
|---|---|---|---|---|---|
| A | 0 | 0 | 100 | 0.55 | Very poor. |
| B | 0.15 | 1 | | 0.54 | Poor. |
| C | 0.45 | 3 | | 0.43 | Good. |
| D | 0.74 | 5 | 125 | 0.40 | Excellent. |

This series illustrates dramatically the remarkable effect of less than 5% of AQD on the strength and transparency of the resulting coating composition. The shear-strength uniformity is desirably affected with minimum amounts, but amounts of 3% or more are necessary to realize significant improvement in this property.

EXAMPLE VII

The beneficial effect of adding a small amount of the aluminum salt of quinacridone sulfonic acid to a mixture of crude quinacridone and 2,9-dimethyl quinacridone is illustrated as follows:

Sixty parts of crude quinacridone and 40 parts of 2,9-dimethylquinacridone are milled with 900 parts of hydrated aluminum sulface and 27 parts of perchloroethylene in a manner similar to that of Example VI both with and without the aluminum salt of quinacridone sulfonic acid.

A—no agent
B—5 parts agent (AQD)

The resulting products are maroon pigments which are solid solutions of the two ingredients. Examination of the enamels prepared from these pigments shows B to be stronger and more transparent than A.

EXAMPLE VIII

As in Example VIA, a charge of β quinacridone is milled in the presence of hydrated aluminum sulfate and perchloroethylene for 24 hours.

(A) One portion of this mill powder is extracted in 2% sulfuric acid for 2 hours at the boil, filtered, washed, and dried.

(B) 2 parts of quinacridone is dissolved in 63.8 parts of conc. $H_2SO_4$ and the mixture heated at 100° C. for 2 hours and then poured into 985 parts cold (0° C.) water. Thereupon a portion of the mill powder equivalent to 40 parts of quinacridone is added to the cold solution of sulfonated quinacridone thus dissolving some of the aluminum sulfate and precipitating the aluminum salt of quinacridone sulfonic acid. The slurry is then heated at 100° C. for 2 hours, filtered, washed and dried to give a beta phase quinacridone. The enamel from B is superior to the control from A in tinting strength and transparency. Also it shows a remarkable improvement in shear-strength uniformity.

EXAMPLE IX

This is similar to Example VIII, except that in lieu of the quinacridone used in Sample B in the preparation of the sulfonated quinacridone, 2 parts of 4,11-dimethylquinacridone is used. This results in the formation of sulfonated 4,11-dimethylquinacridone, which on subsequent treatment as specified in Example VIII is precipitated as the aluminum salt. The final treated quinacridone is the beta modification and shows the same advantages in strength, transparency and shear-strength uniformity as does the corresponding product treated with 5% of AQD (Example VIII).

In like manner, other substituted quinacridones (e.g. 3,10 - difluoro-, 2,9 - dimethoxy-, 4,11 - dichloro-, 2,9-diethyl-), and all of the other substituted quinacridones encompassed by the above-mentioned generic formula may be sulfonated, and the aluminum salts thereof utilized to effect the afore-mentioned improvements.

EXAMPLE X

This example illustrates the application of the method to the preparation of a γ-phase quinacridone of similarly improved properties.

Into a one-quart ball mill is charged 15 g. of crude γ-phase quinacridone (U.S. 2,844,581), 135 g. of aluminum sulfate $(Al_2(SO_4)_3 \cdot 15H_2O)$, 1500 g. of ¼" steel balls, 150 g. of roofing nails, and 4 g. of perchloroethylene. The mill is tightly sealed, and is rotated in conventional fashion for 72 hours. The contents of the mill are then discharged and screened to remove the steel balls and nails.

(A) One portion of this mill powder is extracted in 2% aqueous sulfuric acid for 2 hours at the boil. It is then filtered, washed and dried.

(B) To 63.8 g. of conc. $H_2SO_4$ is added 2 g. of quinacridone and the mixture is stirred to solution. It is then heated at 100° C. for 2 hours, following which it is poured with stirring into 985 g. of water at 0° C. Into an aliquot equivalent of one-fourth of the resulting solution is added a portion of the mill powder equivalent to 15 g. of quinacridone. The slurry is then heated at 100° C. for 2 hours, following which the product is isolated in the conventional manner by filtering, washing and drying. The pigment thus obtained shows the typical X-ray diffraction which is characteristic of γ-phase quinacridone.

The enamel from Sample B is superior to the control from A in tinting strength, transparency and shear-strength uniformity.

Similar samples using 1% and 3% of the aluminum salt of quinacridone sulfonic acid in place of the 5% in Sample B, also show improvements in tinting strength and transparency though somewhat less than B.

EXAMPLE XI

The treatment of quinacridone pigments with quinacridone sulfonic acid alone is illustrated as follows:

A portion of quinacridone is sulfonated by dissolving in 19 times its own weight of 96% sulfuric acid and heating at 100° C. for 2 hours. This solution is then cooled to ambient temperature and used in subsequent treatments on the assumption that 20 parts thereof contains 1.5 parts of quinacridone disulfonic acid.

100 parts of quinacridone is dissolved in 1000 parts of 96% $H_2SO_4$ at a temperature of 5–10° C. together with an appropriate amount of the above sulfuric acid suspension of quinacridone sulfonic acid as specified below. The resulting solution is then introduced continuously through a small orifice into the center of a stream of cold water flowing under pressure through a constricted tube in a state of turbulent flow, the ratio of water to acid being about 10 to 1 and the temperature rising being in the order of 15° C. The resulting strongly acid slurry is digested at 95° C. for 1 hour, filtered, washed and dried at 60° C. The resulting pigments are dispersed in lithographic varnish by standard techniques and examined for relative particle size, strength and transparency. The following table summarizes this series of experiments:

| Sample | Amount of Quinacridone Sulfonic Acid Used, Percent | Relative Particle Size | Relative Strength | Relative Transparency |
|---|---|---|---|---|
| A | 0 | Reference | Reference | Reference. |
| B | 1 | Sl. smaller | Sl. stronger | More transparent. |
| C | 3 | Smaller | Stronger | Do. |
| D | 5 | do | do | Do. |

It is apparent that the introduction of quinacridone sulfonic acid has inhibited particle growth during digestion resulting in increased strength and transparency. In like manner all of the other substituted quinacridone sulfonic acids embraced by the afore-mentioned formula may be utilized to accomplish the same improvement in properties.

EXAMPLE XII

The use of other metal salts of quinacridone sulfonic acid than aluminum is illustrated as follows:

This series of experiments substantially reproduces Example XI, Sample D, using 5% quinacridone sulfonic acid, except that the water into which the sulfonic acid solution is drowned contains different metal salts in chemically equivalent amounts as listed below. Sample A is a control in which no agent is used.

| Sample: | Metal salt |
|---|---|
| A | None. |
| B | $Al_2(SO_4)_3 \cdot 18H_2O$. |
| C | Magnesium chloride. |
| D | Zinc chloride. |
| E | Cupric chloride. |
| F | Cadmium chloride. |
| G | Nickel chloride. |
| H | Chromic chloride. |
| I | Cobalt chloride. |
| J | Manganous chloride. |

These products, treated with metal salts of quinacridone sulfonic acid, upon examination for particle size, are found to be substantially equivalent to each other, and appreciably smaller than the particles of Sample A having no agent present. It is concluded that the nature of the metal salt of the quinacridone sulfonic acid is not critical in the inhibition of particle growth during digestion.

This invention makes possible a quinacridone pigment of excellent shear-strength uniformity without substantial impairment of strength or tinctorial qualities. Further, only a very small proportion of additive (1% to 20%) is required with optimum use of the sulfonated quinacridone compound, whereas with prior art agents, such as aluminum benzoate, at least 20% and usually more is needed under optimum conditions to produce comparable improvement in dispersion characteristics. Another advantage is that the quinacridone sulfonic acid compounds are effective not only in improving shear-strength uniformity but also in inhibiting particle size growth during the pigment extraction steps, with the result that coating compositions prepared from such pigments show remarkable improvement in tinting strength and transparency. Furthermore, where the attainment of a particular degree of transparency is desired, the incorporation of the aluminum quinacridone sulfonate, for instance, into the quinacridone during the milling step for particle size reduction makes possible much shorter milling cycles. Frequently, the time required may be reduced by as much as half. Also, in contrast to many prior art treating agents, the compounds of this invention do not produce an adverse effect on the ease of grinding of the pigments into vehicles. Further, the sulfonated quinacridone compounds, unlike prior art additives, contribute in a positive way to the color of the mixture.

The magnitude of the effect of the added sulfonated quinacridone compounds varies with the nature of the vehicle in which the pigment is dispersed. Beneficial effects are observed in all the various types of vehicles considered, including alkyds, acrylic lacquers, thermosetting acrylic enamels, and melamine-fortified alkyd vehicles. Similarly, the effect is believed to be generally applicable to all organic vehicles, although in some instances sufficiently good dispersion is obtained with conventional quinacridone in the absence of an added agent so that little effect is evident.

Although the detailed examples show the sulfonic acid substituents only in the 2 and/or 9 position in the quinacridone molecule, quinacridones with sulfonic acid groups in other positions are effective. In Example I, for instance, if m-aminobenzenesulfonamide had been used in place of sulfanilamide, sulfonic acid substituents would have been obtained in the 3 and/or 10 position. Similarly, if o-aminobenzenesulfonamide had been used, sulfonic acid substituents in the 4 and/or 11 position would have been obtained. However, the superior lightfastness of the 2,9-compounds in comparison with the isomers must be recognized. Furthermore, substituted quinacridones may be sulfonated and the resulting products used in similar manner to effect desirable improvements, as is indicated in Example IX.

The beneficial effects obtained with gamma and beta phase quinacridones are also evident in alpha-phase pigments on treatment with the sulfonated quinacridone compounds such as the aluminum salt. In all instances, the pigment treated with the quinacridone sulfonic acid compound is equal to the corresponding untreated pigment with respect to alkali and soap resistance. The outdoor durability of coating compositions pigmented with the compounds of this invention is essentially unchanged.

Similar beneficial effects are also obtained with other quinacridone compounds such as 4,11-dichloroquinacridone, 2,9-dichloroquinacridone, 2,9-difluoroquinacridone, 4,11 - difluoroquinacridone, 2,9 - dimethylquinacridone, 4,11-dimethoxyquinacridone, 2,9-dimethoxyquinacridone, quinacridonequinone, 2,9 - dichloroquinacridonequinone, 4,11-dichloroquinacridonequinone, and the solid solutions of quinacridone or of quinacridone and quinacridonequinone or substituted derivatives thereof in systems in which these pigments show poor shear-strength uniformity or are deficient in transparency.

Since it is obvious that many changes and modifications can be made in the above-described details without departing from the nature and spirit of the invention, it is to be understood that the invention is not to be limited to said details except as set forth in the appended claims.

What is claimed is:

1. A pigment composition consisting essentially of a quinacridone pigment and 1 to 20% by weight of at least one of the sulfonated quinacridones corresponding to the formula:

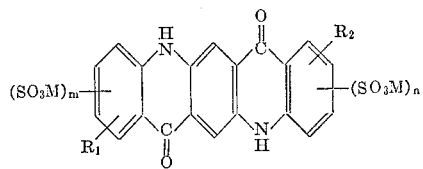

wherein $m$ and $n$ are integers of from 0 to 1 and the sum of $m$ and $n$ is from 1 to 2, $R_1$ and $R_2$ are selected from the group consisting of hydrogen, lower alkyl, lower alkoxyl, and halogen, and M is selected from the group consisting of hydrogen, aluminum, magnesium, zinc, divalent copper, cadmium, nickel, trivalent chromium, cobalt, and divalent manganese.

2. The pigment composition of claim 1 in which M, $R_1$ and $R_2$ are hydrogen.

3. The pigment composition of claim 1 in which M is aluminum.

4. The pigment composition of claim 3 in which $R_1$ and $R_2$ are hydrogen.

5. The pigment composition of claim 3 in which the quinacridone pigment is beta phase quinacridone.

6. The pigment composition of claim 3 in which the quinacridone pigment is gamma phase quinacridone.

7. A process for improving the shear-strength uniformity and dispersion properties of a quinacridone pigment which comprises adding to a composition consisting essentially of said quinacridone pigment, an amount of a sulfonated quinacridone of claim 1, said sulfonated quinacridone being added in the amount of about 1 to 20% by weight based on the final total weight of quinacridone compounds present in the composition.

8. In the process for extracting a quinacridone pigment from an aqueous solution of said quinacridone pigment, the improvement which comprises the incorporation of an amount of a sulfonated quinacridone compound of claim 1 in the aqueous solution to inhibit the crystal growth of the quinacridone pigment, said sulfonated quinacridone being added in the amount of about 1 to 20% by weight based on the final total weight of quinacridone compounds present in the composition.

References Cited

UNITED STATES PATENTS 2,816,045  12/1957  Cooper et al. _____ 106—288

FOREIGN PATENTS 896,803  5/1962  Great Britain.

HELEN M. McCARTHY, *Primary Examiner.*

JAMES E. POER, *Examiner.*

TOBIAS E. LEVOW, *Assistant Examiner.*